(12) United States Patent
Lagenstroeer et al.

(10) Patent No.: US 10,246,926 B2
(45) Date of Patent: Apr. 2, 2019

(54) DRIVER FOR A MOVABLE WINDOW PANE, WINDOW PANE ARRANGEMENT

(71) Applicant: Volkswagen Aktiengesellschaft, Wolfsburg (DE)

(72) Inventors: Kai Lagenstroeer, Gifhorn (DE); Pedro Almeida, Tappenbeck (DE); Joerg Havemann, Bad Bodenteich (DE)

(73) Assignee: Volkswagen Aktiengesellsschaft, Wolfsburg (DE)

( * ) Notice: Subject to any disclaimer, the term of this patent is extended or adjusted under 35 U.S.C. 154(b) by 0 days.

(21) Appl. No.: 15/275,758

(22) Filed: Sep. 26, 2016

(65) Prior Publication Data
US 2017/0008378 A1    Jan. 12, 2017

Related U.S. Application Data

(63) Continuation of application No. PCT/EP2015/055663, filed on Mar. 18, 2015.

(30) Foreign Application Priority Data

Mar. 25, 2014 (DE) .................. 10 2014 205 548

(51) Int. Cl.
*E05F 11/38* (2006.01)
*B60J 1/00* (2006.01)

(52) U.S. Cl.
CPC ............. *E05F 11/385* (2013.01); *B60J 1/004* (2013.01); *E05F 2011/387* (2013.01);
(Continued)

(58) Field of Classification Search
CPC ..................... E05F 11/385; E05F 2011/387
(Continued)

(56) References Cited

U.S. PATENT DOCUMENTS 4,866,895 A * 9/1989 Hlavaty ............... B60J 1/17
52/204.597
5,778,599 A * 7/1998 Saito ............... E05F 11/385
49/375

(Continued)

FOREIGN PATENT DOCUMENTS

CN    202718517    2/2013
CN    203113782    8/2013

(Continued)

OTHER PUBLICATIONS

Chinese Office Action for Application No. 201580015907.8 dated Jul. 13, 2017, with English Translation.

*Primary Examiner* — Catherine A Kelly
(74) *Attorney, Agent, or Firm* — Muncy, Geissler, Olds & Lowe, P.C.

(57) ABSTRACT

A driver for a movable window pane, in particular of a motor vehicle, having a receptacle recess, a receptacle of an edge section of the window pane, and having an elastically displaceable detent lug which is designed to engage in a latching cutout of the window pane in order to arrest the window pane on the driver, wherein the detent lug, in the reset position thereof, obstructs the receptacle recess and has an insertion taper assigned to the receptacle recess such that the detent lug is displaced into a position releasing the receptacle recess by insertion of the window pane into the receptacle recess. The detent lug has a catch groove on the insertion taper which extends parallel to the receptacle recess over the detent lug.

8 Claims, 2 Drawing Sheets

(52) U.S. Cl.
CPC ..... *E05Y 2201/434* (2013.01); *E05Y 2600/53* (2013.01); *E05Y 2600/60* (2013.01); *E05Y 2800/424* (2013.01); *E05Y 2900/55* (2013.01)

(58) Field of Classification Search
USPC .................................................. 49/374, 375
See application file for complete search history.

(56) References Cited

U.S. PATENT DOCUMENTS

| | | | | |
|---|---|---|---|---|
| 5,992,099 | A * | 11/1999 | Thomas | E05F 11/385 49/375 |
| 6,810,623 | B2 * | 11/2004 | Messlez | B60J 1/17 49/352 |
| 7,430,831 | B2 * | 10/2008 | Castellon | E05F 11/385 49/375 |
| 7,584,573 | B2 * | 9/2009 | Yoshii | E05F 11/385 49/372 |
| 8,146,293 | B2 * | 4/2012 | Brownlie, Jr. | E05F 11/385 49/375 |
| 8,739,467 | B2 * | 6/2014 | Reno | E05F 11/385 49/348 |
| 8,966,820 | B2 * | 3/2015 | Broadhead | B60J 5/0416 49/348 |
| 2009/0090064 | A1 * | 4/2009 | Tudora | E05F 11/385 49/348 |
| 2009/0193718 | A1 * | 8/2009 | Tudora | E05F 11/385 49/358 |
| 2010/0088964 | A1 * | 4/2010 | Costigan | E05F 11/385 49/372 |
| 2010/0313481 | A1 | 12/2010 | Brownlie, Jr. et al. | |
| 2014/0007507 | A1 * | 1/2014 | Umemura | E05F 11/481 49/349 |

FOREIGN PATENT DOCUMENTS

| | | |
|---|---|---|
| CN | 203285230 | 11/2013 |
| DE | 694 01 793 T2 | 6/1997 |
| DE | 100 39 688 A1 | 3/2002 |
| DE | 20 2008 006 718 U1 | 9/2009 |
| DE | 10 2012 223 825 A1 | 7/2013 |
| DE | 10 2012 208 562 A1 | 11/2013 |
| SE | 10 2004 031 805 A1 | 1/2006 |

\* cited by examiner

DRIVER FOR A MOVABLE WINDOW PANE, WINDOW PANE ARRANGEMENT

This nonprovisional application is a continuation of International Application No. PCT/EP2015/055663, which was filed on Mar. 18, 2015, and which claims priority to German Patent Application No. 10 2014 205 548.2, which was filed in Germany on Mar. 25, 2014, and which are both herein incorporated by reference.

BACKGROUND OF THE INVENTION

Field of the Invention

The invention relates to a driver for a movable window pane, in particular of a motor vehicle, including a receptacle recess for receiving an edge section of the window pane, and including an elastically displaceable detent lug, which is designed to engage with a latching cutout of the window pane for the purpose of locking the window pane on the driver, the detent lug, in its initial position, obstructing the receptacle recess and having an insertion taper assigned to the receptacle recess, so that the detent lug is displaced into a position releasing the receptacle recess by the insertion of the window pane into the receptacle recess. The invention furthermore relates to a window pane arrangement, in particular for a motor vehicle, including a movable window pane and including a driver which is connectable/connected to the window pane.

Description of the Background Art

Drivers and window pane arrangements are known from the prior art. Adjustable or movable window panes in motor vehicles are generally guided in a frame and are adjusted by a driver which is driven along a guideway by means of a driving device, whereby the window pane connected to the driver may be raised or lowered.

To push the window upward, for example, it is sufficient to press the driver against one side of the window pane. To be able to also move the window pane in the opposite direction with the aid of the driver, the driver must be fixedly connected to the window pane. Methods are known for providing the driver with the detent lug, which permits an easy and, in particular, toolless mounting of the driver on the window pane. A corresponding driver is described in DE 10 2012 223 825 A1, for example. The driver has a receptacle recess, into which the window pane is insertable with an edge section. The detent lug is assigned to the receptacle recess and, in its relaxed state or in its initial position, obstructs the receptacle recess. When the window pane is inserted into the receptacle recess, it strikes the detent lug, which is provided with an insertion taper. The insertion taper is assigned to the receptacle recess in such a way that the detent lug is displaced or forced back out of the of the initial position into the position releasing the receptacle recess by the insertion of the window pane into the receptacle recess. The window pane has a latching receptacle in the end section, with which the detent lug automatically engages due to its elastic connection to the driver and thereby locks the window pane on the driver in a form-locking manner when the window pane has been inserted correspondingly far into the receptacle recess.

However, it has turned out that this simple type of mounting is associated with a particular disadvantage. The driver may namely be easily detached from the window pane with the aid of an auxiliary tool if, for example, a narrow metal sheet is inserted through an opening gap between a frame guiding the window pane or the door frame and the window pane into an inner space, for example of the motor vehicle door having the window pane arrangement, and is pushed between the detent lug and the window pane in such a way that the detent lug is displaced thereby out of the latching cutout of the window pane. In the aforementioned unexamined patent application, an attempt is made to avoid this disadvantage by providing an additional securing means or an additional securing element. However, the disclosed approaches are structurally complex and thus also result in a corresponding financial cost in their manufacture.

SUMMARY OF THE INVENTION

It is therefore an object of the invention to provide a driver and a window pane arrangement having a corresponding driver which securely prevents an improper manipulation of the connection between the driver and the window pane.

In an exemplary embodiment, a driver has the advantage that the security against an undesirable detachment of the locking mechanism is increased by a very simple structural measure on the detent lug. In particular, the driver according to the invention prevents a manipulation tool inserted between the detent lug and the window pane from being able to completely displace the detent lug out of the latching cutout of the window pane. For this purpose, the invention provides that the detent lug of the driver has a catch groove on the insertion taper, which extends parallel to the receptacle recess over the detent lug. According to the invention, therefore, a catch groove is provided which extends over the insertion taper. The catch groove extends parallel to the receptacle recess and thus perpendicularly to the usual displacement direction of the detent lug, which is generally perpendicular to the plane of the window pane. If a manipulation tool is now inserted between the window pane and the detent lug, the detent lug is displaced out of the latching cutout only as far as the manipulation tool slides along the insertion taper into the catch groove. At least the tip of the manipulation tool is caught in this location. A further insertion of the manipulation tool is then no longer possible. Accordingly, the detent lug may not be further displaced out of the latching cutout, whereby the window pane remains locked or the lock remains secure.

According to an embodiment of the invention, the catch groove is situated in the latching cutout of the window pane when the window pane is inserted into the receptacle recess. This ensures that, when a manipulation tool is inserted between the detent lug and the window pane, the tip of the manipulation tool is guided or pushed by the insertion taper onto the catch groove, which is moved out of the latching opening of the window pane. This prevents the manipulation tool from striking the section of the insertion taper situated between the catch groove and the tip of the detent lug facing the window pane and thereby passing over the catch groove.

The catch groove can be designed to be narrower than the receptacle recess, in particular narrower than the window pane. Due to the narrow design of the catch groove, the wider window pane is able to bridge the catch groove when inserted into the receptacle recess and is thereby able to force the detent lug all the way back into the position releasing the receptacle recess. The easy mounting of the window pane on the driver remains ensured despite the provision of the catch groove.

The catch groove can be at least as wide as the widest opening engageable by the manipulation tool or the gap opening between the window pane and, for example, the window pane seal or frame. This ensures that each manipulation tool or auxiliary tool insertable through the corresponding opening is able to be securely caught in the catch groove.

The insertion taper also can include a first guiding section and a second guiding section, which have an inclined orientation to each other. The insertion taper thus can have at least two different slopes or angles of slope. For example, the insertion of the window pane into the receptacle recess and the forcing back of the detent lug are simplified thereby.

The catch groove can be situated between the first guiding section and the second guiding section. This has the advantage that the catch groove is provided in a kink of the insertion taper, whereby the catching effect of the catch groove is increased. In particular, the section of the insertion taper between the catch groove and the tip of the detent lug is situated at a greater angle to the insertion direction of the window pane than the first guiding section. An auxiliary tool is thereby guided steeply into the catch groove, whereby a security against a bridging of the catch groove by the auxiliary tool is further increased.

According to an embodiment of the invention, at least one side wall of the catch groove can be also oriented essentially perpendicularly to a base of the catch groove. A right angle is formed thereby between the side wall and the base of the catch groove, in which the manipulation tool may be particularly securely caught. In particular, the aforementioned side wall is the side wall of the catch groove facing the window pane. This side wall can extend parallel to the window pane when the detent lug has been displaced a correspondingly far distance out of the latching cutout of the window pane by the manipulation tool in order to securely lock the auxiliary tool in the catch groove.

Further, the window pane arrangement according to the invention prevents the detent lug from being able to be displaced out of the latching cutout of the window pane by the insertion of a simple manipulation tool.

The window pane can have at least one insertion chamfer on its edge facing the driver. This insertion chamfer may be formed, for example, by disk grinding or the like. The insertion chamfer makes it easier to insert the window pane into the receptacle recess and, in particular, to displace the detent lug into the position releasing the receptacle recess.

The insertion chamfer can be designed in such a way that it bridges the catch groove of the detent lug when the window pane is inserted into the receptacle recess. The insertion chamfer is thus designed to be of such a size that the window pane does not itself interact with the catch groove when it is inserted into the receptacle recess. Due to a correspondingly large insertion chamfer, the window pane instead directly strikes the second guiding section of the insertion taper of the detent lug. As a result, the security against unauthorized detachment of the connection between the driver and the window pane is ensured, on the one hand, and the easy mountability of the window pane on the driver is simultaneously maintained.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
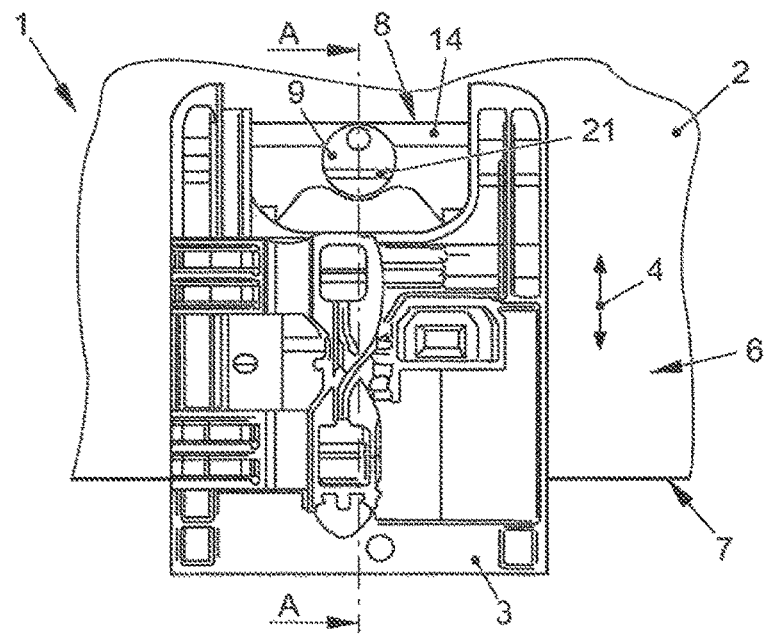
FIG. 1 shows a top view of a driver, including a window pane arrangement.

FIG. 1 shows a simplified top view of a window pane arrangement 1, which comprises a window pane 2 and a driver 3. Driver 3 is used to move window pane 2 up and down in a frame, which is not illustrated here, as indicated by a double arrow 4. For this purpose, driver 3 is driven, for example, by an electrical actuator device. To transport the window pane by driver 3 in both desired directions, the driver is connected to window pane 2 in a form-fitting manner.

Figure 2A:
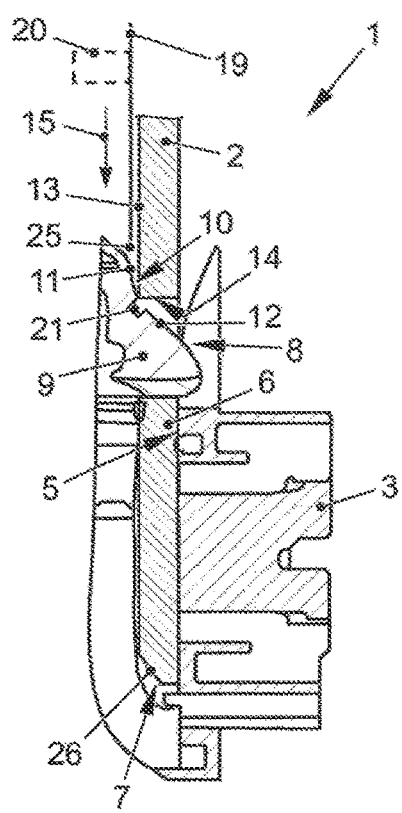
FIGS. 2A and 2B show a side view of the driver in different situations.
Figure 2B:
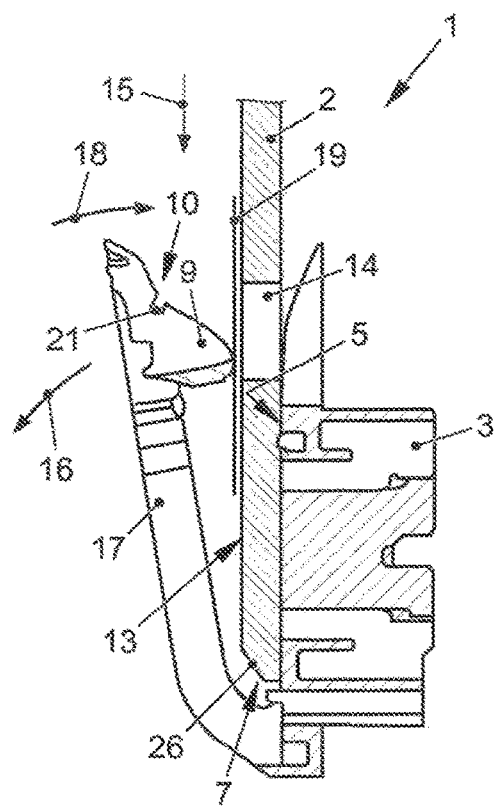

To this end, FIGS. 2A and 2B show window pane arrangement 1 in a sectional representation in each case, along line A-A from FIG. 1.

Driver 3 has a receptacle recess 5, in which an edge section 6 of window pane 2 is accommodated. Receptacle recess 5 is designed in such a way that window pane 2 is held in receptacle recess 5 in an essentially form-fitting manner and preferably essentially without clearance. In particular, the width of receptacle recess 5 illustrated in the side view corresponds to the width of window pane 2 in its edge area 6. On its outer edge 7, window pane 2 bumps against driver 3 so that driver 3 is able to move upward, due to an upward movement of window pane 2. A latching device 8 is provided to be also able to move window pane 2 in the opposite direction.

Latching device 8 has an elastically displaceable detent lug 9. In the initial state illustrated in FIG. 2A, the detent lug extends through receptacle recess 5 and obstructs it thereby. Detent lug 9 has an insertion taper 10 on its upper side, which faces receptacle recess 5 or window pane 2. Insertion chamfer 10 has a first guiding section 11 as well as a second guiding section 12, which are oriented to be inclined toward each other, so that first guiding section 11 encloses a smaller angle with window pane 2 than second guiding section 12, which essentially extends in the area of receptacle recess 5 or therethrough. First guiding section 11 is essentially assigned to outside 13 of window pane 2. Window pane 2 furthermore has a latching cutout 14, through which detent lug 9 extends in areas. The underside of detent lug 9 has a planar design, so that it extends essentially horizontally through receptacle recess 5. The underside of detent lug 9 is assigned to the lower edge of latching cutout 14, so that detent lug 9 rests on the lower edge of latching cutout 14. If driver 3 is now pulled downward, the tensile force is transferred by detent lug 9 to window pane 2.

Window pane arrangement 1 is very easily mounted, as illustrated in FIG. 2B. For mounting, window pane 2 is easily pushed from above into receptacle recess 5 with its edge 7 first, as indicated by an arrow 15. Edge 7 strikes insertion taper 10 of detent lug 9. Insertion taper 10 then causes detent lug 9 to be displaced outwardly from the area of receptacle recess 5, as indicated by an arrow 16. In the present case, detent lug 9 is fixedly formed with a side wall 17 of driver 3 delimiting receptacle recess 5 toward the front. Side wall 17 is either itself designed to be elastic or it is held elastically on driver 3, so that it is elastically displaceable according to arrow 16 to ensure the displacement of detent lug 9 out of the area of receptacle recess 5 by the insertion of window pane 2. Once detent lug 9 has been displaced out of its initial position into the position releasing receptacle recess 5, as illustrated in FIG. 2B, window pane 2 may be completely inserted all the way into receptacle recess 5 so that latching cutout 14 is then situated in the area of detent lug 9. Due to the intrinsic elasticity of the bearing of detent lug 9, the latter springs back independently into its initial position according to arrow 18, in which it is situated in latching cutout 14, as shown in FIG. 2A, to lock driver 3 on window pane 2.

This very easy mounting capability has the disadvantage that, unless further precautions are taken, detent lug 9 may be displaced outwardly according to arrow 16 in FIG. 2B by inserting a manipulation tool 19, which is designed, for example, as a thin sheet-metal element, through an opening gape between a door frame 20, which is only indicated here, and window pane 2 up to detent lug 9, thereby enabling driver 3 to be detached from window pane 2.

To avoid this disadvantage, detent lug 9 is provided with a catch groove 21 in the present case.

Figure 3:
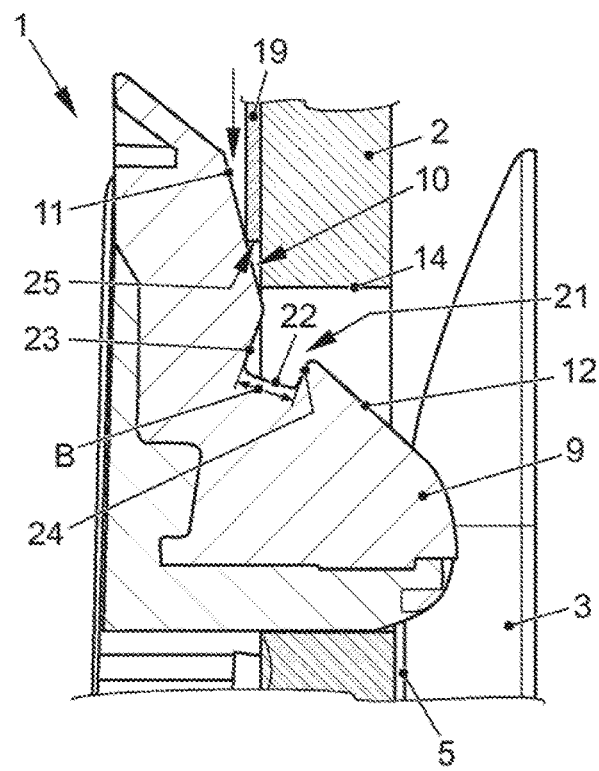
FIG. 3 shows a detailed view of the driver.
Figure 4:
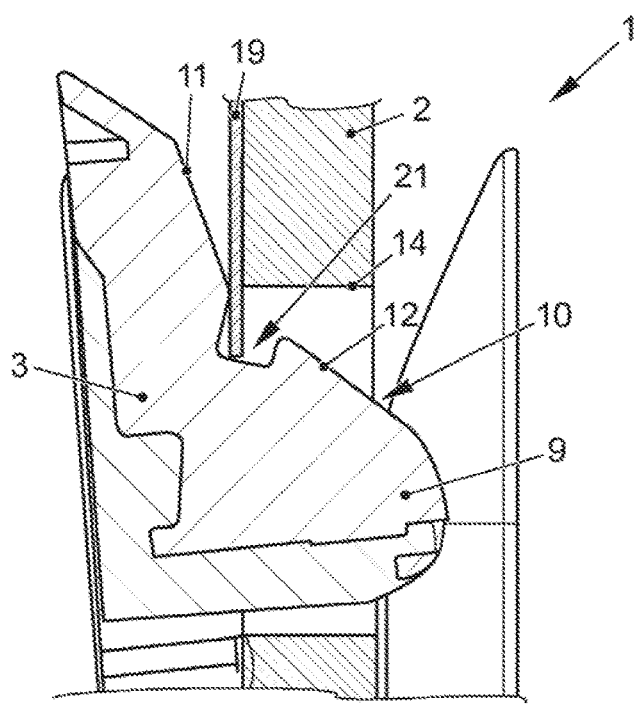
FIG. 4 shows a detailed view in a position of use.

To this end, FIG. 3 shows an enlarged detailed view of detent lug 9, including catch groove 21. Catch groove 21 is situated between first guiding section 11 and second guiding section 12 of insertion taper 10. Catch groove 21 extends parallel or substantially parallel to receptacle recess 5 over the entire width of detent lug 9, as shown, in particular, in FIG. 1. Catch groove 21 has a base 22 as well as two diametrically opposed side walls 23 and 24, which are oriented perpendicularly to base 22. Catch groove 21 is formed in detent lug 9 in such a way that, in the initial position of detent lug 9, it is situated within latching cutout 14 of window pane 2. Width B of catch groove 21 is selected to be at least as wide as the maximum gap opening between window 2 and door frame 20 but narrower than the width of window pane 2.

Catch groove 21 easily prevents driver 3 from being detached from window pane 2, as described above. A manipulation tool 19, which fits through the opening gap between door frame 20 and window 2 and is pushed along window pane 2, as described above, all the way to detent lug 9, initially forces the latter a short distance out of latching cutout 14 until tip 25 of the manipulation tool enters catch groove 21, which was moved out of latching recess 14. Once manipulation tool 19 has been caught thereby in catch groove 21, it is unable to be pushed father downward or move the detent lug farther out of latching cutout 14 by the manipulation tool. The security of window pane arrangement 1 is particularly easily protected hereby against a manipulation attempt. The fact that catch groove 21 extends over the entire width of detent lug 9 ensures that a manipulation tool 19, which is pushed up to detent lug 9, also always enters catch groove 21.

Window pane 2 is advantageously provided with an insertion chamfer 26 on its edge 7, as is illustrated, in particular, in FIGS. 2A and 2B. Insertion chamfer 26 is designed to be so wide that insertion chamfer 26 bridges catch groove 21 when window pane 2 is inserted into receptacle recess 5 in such a way that edge 7 always strikes second section 12 of insertion taper 10 of detent 9 upon insertion, so that detent lug 9 is always able to be placed in the position releasing receptacle recess 5 by the insertion of window pane 2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A driver for a movable window pane of a motor vehicle, comprising:
   a receptacle recess for receiving an edge section of the window pane;
   an elastically displaceable detent lug adapted to engage with a latching cutout of the window pane for locking the window pane on the driver, the detent lug obstructing the receptacle recess in an initial position; and
   wherein the detent lug has an insertion taper so that the detent lug is displaced out of the receptacle recess by an insertion of the window pane into the receptacle recess,
   wherein the detent lug has a catch groove in the insertion taper that extends substantially parallel to the receptacle recess over the entire width of the detent lug,
   wherein the catch groove is arranged in the latching cutout of the window pane when the window pane is inserted into the receptacle recess, and
   wherein the insertion taper has an upper first guiding section and a lower second guiding section that have an inclined orientation to each other, wherein the catch groove is situated between the upper first guiding section and the lower second guiding section and wherein an upper edge of the latching cutout of the window pane directly contacts the upper first guiding section of the insertion taper when the window pane is inserted into the receptacle recess and the detent lug is in the initial position.

2. The driver according to claim 1, wherein the catch groove is narrower than the receptacle recess or narrower than the window pane.

3. The driver according to claim 1, wherein the catch groove is situated between the upper first guiding section and the lower second guiding section.

4. The driver according to claim 1, wherein at least one side wall of the catch groove is oriented at least essentially perpendicularly to a base of the catch groove.

5. A window pane arrangement for a motor vehicle, comprising the movable window pane and the driver according to claim 1.

6. The window pane arrangement according to claim 5, wherein the window pane has at least one insertion chamfer on its edge facing the driver.

7. The window pane arrangement according to claim 6, wherein the insertion chamfer bridges the catch groove of the detent lug when the window pane is inserted into the receptacle recess.

8. The driver according to claim 1, wherein the catch groove has a base, a first side wall that extends from and is directly connected to a first edge of the base and a second side wall that extends from and is directly connected to a second edge of the base, wherein the second side wall and the first side wall oppose one another and are each oriented perpendicular to the base.

* * * * *